Aug. 22, 1933.                    W. J. PEARMAIN                    1,923,453
CLUTCH
Filed Sept. 29, 1930
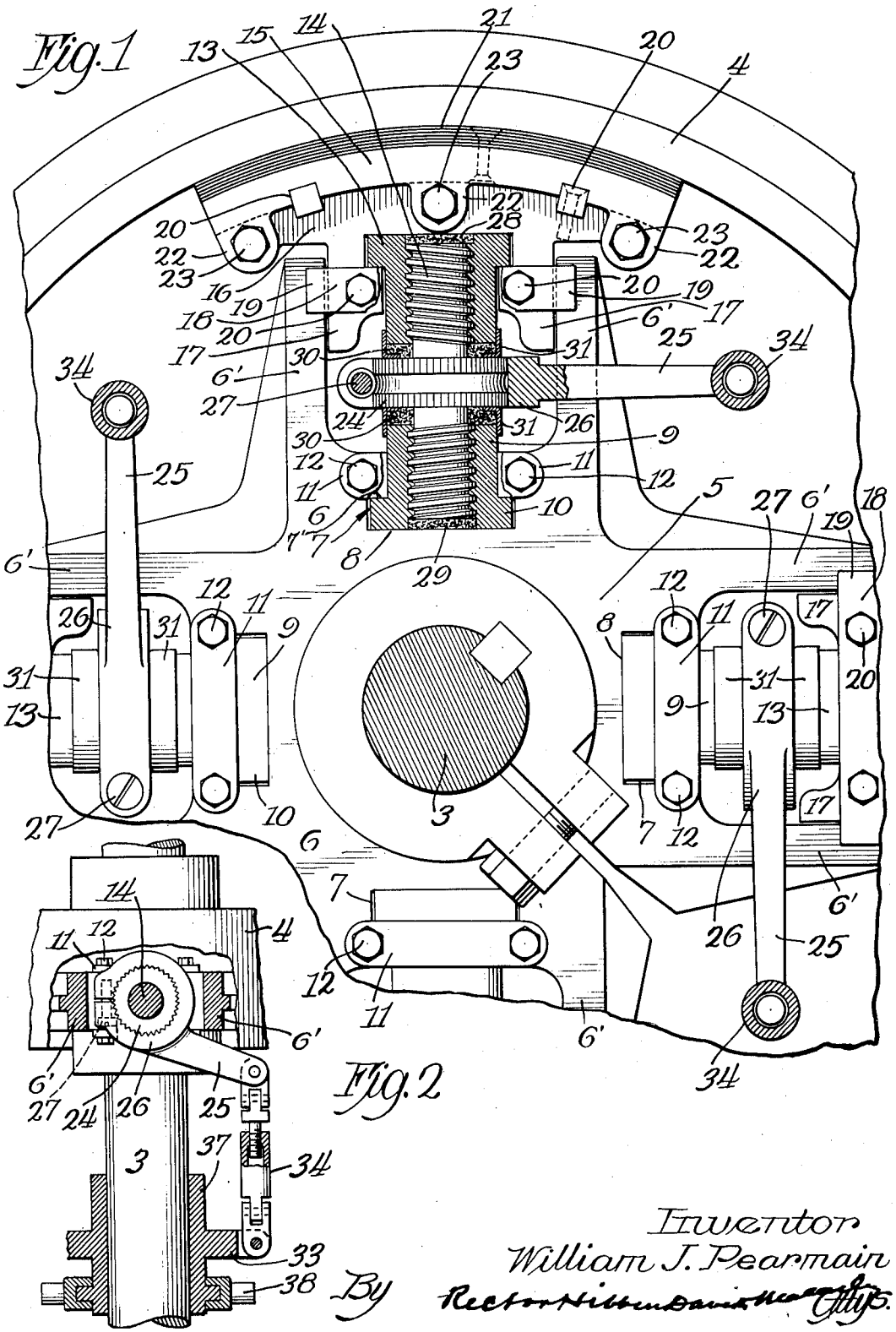

Patented Aug. 22, 1933

1,923,453

UNITED STATES PATENT OFFICE 1,923,453

CLUTCH

William J. Pearmain, Racine, Wis., assignor to
The Twin Disc Clutch Company, Racine, Wis.,
a Corporation of Wisconsin Application September 29, 1930
Serial No. 485,150

3 Claims. (Cl. 192—76)

My invention relates, more specifically stated, to expanding clutches of the well-known type in which friction shoes are mounted upon one of the parts which it is intended to lock against relative rotation and, by suitable means, spread outward against an internal cylindrical or conical surface with which the friction shoes make frictional contact. It is the object of my invention to provide a clutch of this character which is efficient in operation, durable, inexpensive to manufacture and may be readily disassembled, insofar as is necessary to effect repairs due to wear, etc.

In the drawing accompanying and forming a part of this application, Fig. 1 is an elevation of a clutch embodying my invention, partly broken away and partly shown in section on a plane perpendicular to the axis thereof, and Fig. 2 is a fragmentary top plan on a smaller scale, parts being shown in axial section.

In the form of invention chosen for exemplification thereof and shown in the drawing, 3 is a shaft on which the operating element of the clutch is mounted, and 4 the rim of a flywheel or the like with the inner periphery of which the shoes engage when it is desired to lock the shaft to the member 4.

The spider or frame 5 of the clutch may be of cast metal and comprises a number of radial guides, shown at 6, in which the friction shoes are guided. Each guide comprises a pair of guide posts or members 6', the inner and side walls of which are generally parallel and preferably machined. The frame or spider is further cut away intermediate the guide posts of Fig. 2 to form a relatively narrow neck to receive the elongated portion of the sleeve 9 to be presently described and below said neck portion is undercut at 7 to receive the head 10 of said sleeve and to form shoulders 7' which extend over the head when the latter is in position and substantially prevent longitudinal movement of the sleeve. The sleeve 9, above mentioned, is internally threaded for a purpose which will presently appear and is of an external diameter to closely fit within the neck of the spider, previously mentioned. The head 10 of the sleeve extends into and closely fits the undercut extensions or pockets in the spider, referred to above. In assembling the sleeve 9 with the spider it is slid axially of the clutch into the neck and recess of the spider previously mentioned and is held in place therein by straps 11 bolted at 12 to the spider on opposite sides of the latter. The sleeve 9 is flattened on opposite sides where it is engaged by the straps so that the latter hold it from turning. A similar nut or internally threaded sleeve 13 is mounted on each shoe, as will be presently explained. Double screw shafts 14, the threads on the respective opposite ends of which are reversely inclined, engage the respective nuts so that the turning of the shaft in one direction causes the nuts to move apart and, turning the screw shaft in the other direction causes the nuts to approach each other. The nuts 9, however, being held against axial movement, the turning or rotation of the screw shafts affects only the nuts 13.

Each shoe is formed of two sections, which may be readily assembled and disassembled, an outer section 15, and an inner section 16. The inner section comprises an outer head and a tongue portion 17, the outer edges of the latter being parallel and fitting loosely between the guide posts 6'. The tongue members 17 each comprise a pair of parallel guides, between which is a recess or socket for the reception of the nut or internally threaded sleeve 13. The said nut is held in position by a pair of straps 18 having intermediate portions which embrace and hold the sleeve 13 in place and outwardly extending lugs 19 which are bolted at 20 to the respective opposite sides of the guide members 17 and extend over the guide posts 6' to embrace the latter and hold the friction shoe in place but permit it to slide radially of the clutch. It will now be evident that as the double-threaded screw-shaft is rotated in one direction it will move inwardly or outwardly, as the case may be, in the nut 9 and the nut 13 will similarly move on the outer end of the shaft but will have double the motion of the screw shaft.

The outer face of the inner member 16 of the shoe is or may be concentric with the clutch and is provided with keys 20 let into recesses therein and projecting above said surface. The outer member 15 of the shoe is or may be provided with a facing 21 of friction material and the inner surface thereof is formed to fit the outer surface of the inner member 16, being provided also with grooves to receive the keys 20. The outer member 15 of the shoe is likewise provided with inwardly projecting ears 22 which lap over the inner member 16 of the shoe and are bolted to the latter at 23. Thus when it is necessary to reface the shoe with friction material or repair the latter, the bolts 23 may be withdrawn and the outer shoe section slid out parallel to the axis of the clutch, the other parts of the clutch remaining in place. When it is desired to repair or replace parts of the mechanism for expanding and retracting the series of friction shoes, the nuts and double screw shafts or any of them may be removed as units by unbolting and removing the straps 11 and 18 and moving the parts axially of the clutch.

Intermediate the nuts 9, 13, the doubly threaded shaft is formed with an enlargement 24, the outer surface of which may be substantially circular and serrated, and an operating lever 25 is secured to the shaft, being formed for this purpose with a split collar 26 which is internally serrated to correspond to the serration on the enlarged part of the shaft over which it fits. A bolt 27 extends through the end of the split collar and normally holds the latter tight about the enlargement of the shaft. It may be adjusted with reference to the shaft, however, by relieving the pressure of the bolt and may then be turned about the shaft and when the proper adjustment is secured the bolt 27 may again be tightened. Preferably, means are provided for lubricating the doubly-threaded shaft in its bearings. For this purpose I have shown felt washers 28 and 29 located within the bores of the respective nuts at the respective opposite ends of the shaft, and other felt washers 30 which are held against the adjacent ends of the respective nuts by means of cups 31.

Any suitable means may be employed for operating the levers 25. For this purpose, as best seen in Fig. 2, in the exemplary construction, I have employed a ring 33 shiftable along the shaft 3 and connected by links 34 to the outer ends of the respective levers 25. Preferably, the links are connected either to the levers or to the ring by universal joints of any ordinary or usual character, inasmuch as levers 25 have a slight movement radially of the clutch. The links are shown provided with an ordinary turnbuckle construction for adjusting their length. The shifting ring 37 by which the clutch is operated may be provided as usual with trunnions 38 for engagement with the shifting lever.

I claim:

1. In a clutch of the class described including a friction shoe, a spider, radial guides thereon, each comprising a pair of parallel guide posts, an internally threaded sleeve secured between said guide posts, a second internally threaded sleeve secured to the friction shoe in axial alignment with the first said sleeve, a screw shaft the threads at the respective ends of which are reversely pitched, a lever secured to said shaft intermediate its threaded ends, and means for operating the lever, and detachable means for securing each of said sleeves in their operative position and, upon detachment, permitting of removal of said sleeves and shaft as a unit by movement of the same in axial direction.

2. In a clutch of the class described, a spider having radial guides thereon each guide formed of parallel guide posts, a friction shoe for each guide having a tongue extending between the guide posts thereof, an internally threaded sleeve secured to each shoe, a second internally threaded sleeve secured between the posts of each guide in alignment with the internally threaded sleeve on the shoe, a pair of straps secured to the tongue of each said shoe on opposite sides thereof, embracing the said internally threaded sleeve of the shoe and extending partially over the guide posts, an operating shaft the threads on the inner end of which cooperate with the sleeve on the spider and the threads on the outer end of which cooperate with the sleeve on the shoe, means detachable for removal of said second sleeve with said first sleeve and for holding said second sleeve against rotation, a lever connected to the shaft intermediate the threaded sleeves, and means for swinging the lever.

3. In a clutch of the class described, a spider having radial guides thereon in pairs and an undercut recess intermediate the guides of each pair, an internally threaded sleeve having an enlarged head received in said recess, means for securing the sleeve within the recess but permitting its removal axially of the clutch, a friction shoe for each pair of guides having a tongue extending between the same, the tongue being formed with an undercut recess, an internally threaded sleeve having an enlarged head received in said tongue and removable therefrom axially of the clutch, means for retaining the last-mentioned sleeve in position in the tongue of the shoe, an operating shaft, the ends of which are reversely threaded and engage the respective sleeves, and a lever connected to the shaft intermediate its threaded ends and means for swinging the lever.

WILLIAM J. PEARMAIN.